US012653187B2

(12) United States Patent
Milling et al.

(10) Patent No.: US 12,653,187 B2
(45) Date of Patent: Jun. 16, 2026

(54) SULFUR BASED PESTICIDES

(71) Applicants: AGRONATURALIS LTD, Ringwood (GB); SCAM S.P.A, Modena (IT)

(72) Inventors: Richard Milling, Manchester (GB); Matteo Amadei, Correggio (IT)

(73) Assignees: AGRONATURALIS LTD, Ringwood (GB); SCAM S.P.A, Modena (IT)

( * ) Notice: Subject to any disclaimer, the term of this patent is extended or adjusted under 35 U.S.C. 154(b) by 906 days.

(21) Appl. No.: 17/428,800

(22) PCT Filed: Feb. 7, 2020

(86) PCT No.: PCT/EP2020/053122
§ 371 (c)(1),
(2) Date: Aug. 5, 2021

(87) PCT Pub. No.: WO2020/161297
PCT Pub. Date: Aug. 13, 2020

(65) Prior Publication Data

US 2022/0125047 A1 Apr. 28, 2022

(30) Foreign Application Priority Data

Feb. 8, 2019 (GB) ..................................... 1901763
Jul. 17, 2019 (GB) ..................................... 1910221

(51) Int. Cl.
*A01N 37/36* (2006.01)
*A01N 25/04* (2006.01)
*A01N 25/30* (2006.01)
*A01P 3/00* (2006.01)

(52) U.S. Cl.
CPC ............. *A01N 37/36* (2013.01); *A01N 25/04* (2013.01); *A01N 25/30* (2013.01); *A01P 3/00* (2021.08)

(58) Field of Classification Search
CPC ................................ A01N 37/36; A01N 25/30
See application file for complete search history.

(56) References Cited

U.S. PATENT DOCUMENTS

| | | | | |
|---|---|---|---|---|
| 2,976,206 A * | 3/1961 | Bailiee | A01N 59/02 424/713 |
| 3,636,005 A | 1/1972 | Klopping et al. | |

FOREIGN PATENT DOCUMENTS

| | | | | |
|---|---|---|---|---|
| CN | 102573458 B * | 5/2015 | A01N 25/02 |
| CN | 104705293 A | 6/2015 | |
| CN | 107232189 A | 10/2017 | |
| CN | 108887286 A | 11/2018 | |
| DE | 1768556 A1 | 11/1972 | |
| EP | 0891711 A1 | 1/1999 | |
| EP | 2629606 B1 * | 6/2017 | A01N 25/04 |
| FR | 2517516 A1 | 6/1983 | |
| FR | 2599592 A1 | 12/1987 | |
| GB | 1083115 A | 9/1967 | |
| JP | H06-256122 A | 9/1994 | |
| WO | 2012/053894 A2 | 4/2012 | |
| WO | WO-2017037277 A1 * | 3/2017 | A01N 25/02 |
| WO | 2019/029630 A1 | 2/2019 | |

OTHER PUBLICATIONS

Linfield, W.M., "Soap and lime soap dispersants", 1978, Journal of the American Oil Chemists' Society, 55, pp. 87-92 (Year: 1978).*
PubChem, "Di-n-octyl sodium sulfosuccinate", first available 2005, National Library of Medicine, 52 pgs. (Year: 2005).*
Tweedy, "Inorganic sulfur as a fungicide", 1981, Residue Reviews, 78, pp. 43-68 (Year: 1981).*
International Search Report and Written Opinion for International Application PCT/EP2020/053122, dated May 27, 2020.
UK Search Report for Application No. GB1901763.1; dated Jul. 22, 2019.
UK Search Report for Application No. GB1910221.9; dated Jul. 13, 2020.

* cited by examiner

*Primary Examiner* — Jeffrey H Murray
*Assistant Examiner* — Madeline E Braun
(74) *Attorney, Agent, or Firm* — The Dobrusin Law Firm, P.C.

(57) ABSTRACT

Optimised sulfur based pesticides using sulfosuccinates alone and in combination with an anionic surfactant to improve the retention and distribution of sulfur on plant vegetation from aqueous spray solutions.

6 Claims, 6 Drawing Sheets

Figure 4:
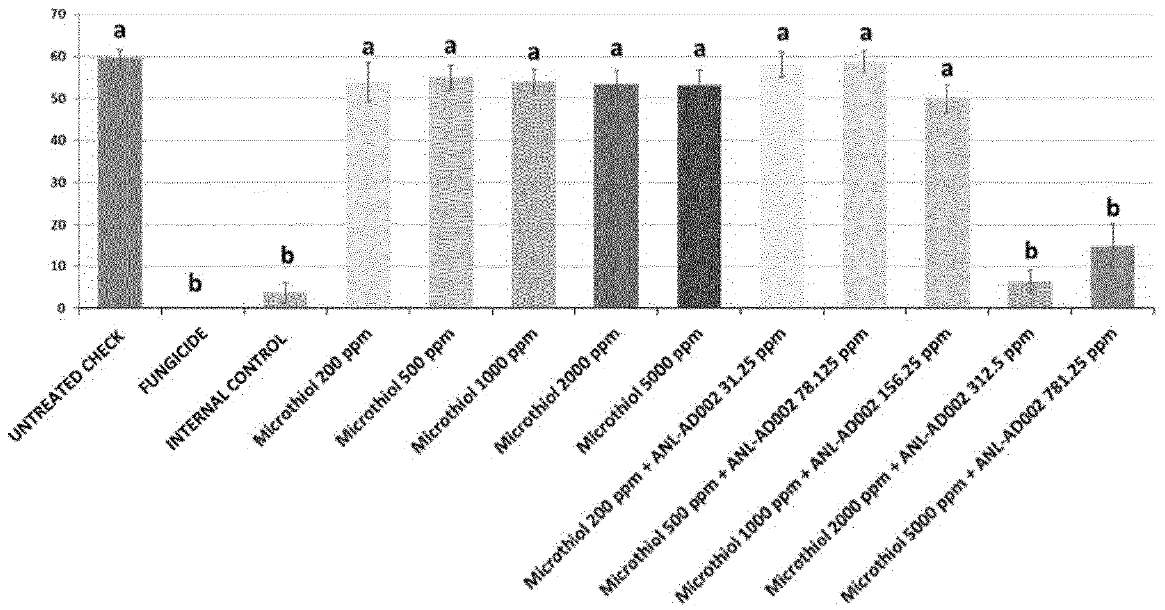

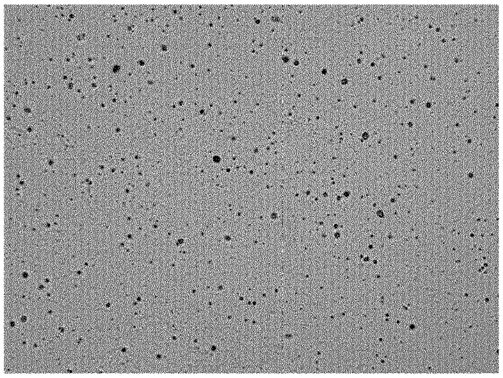
Fig 1a. Blank
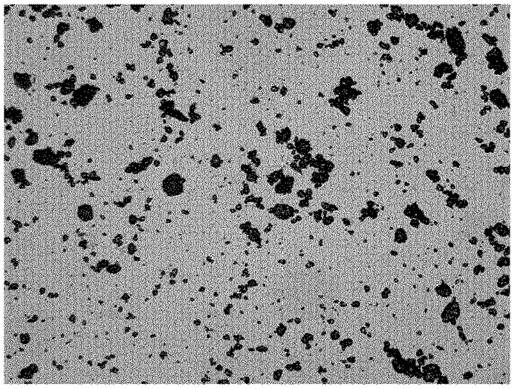
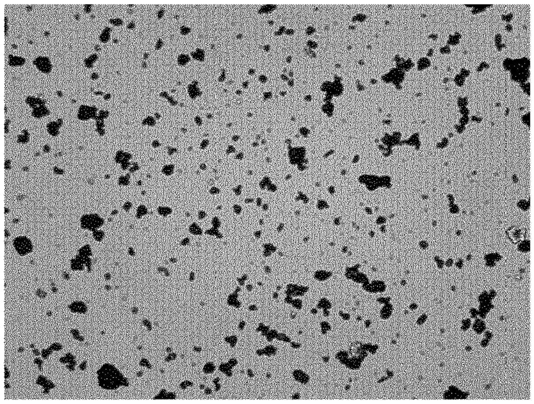
Fig 1b. centre r1 (left) and r2 (right)
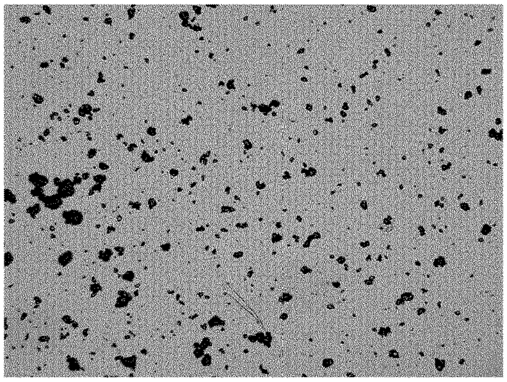
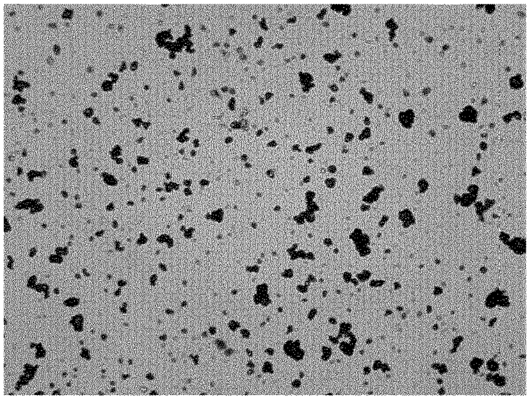
Fig 1c. outer r1 (left) and r2 (right)

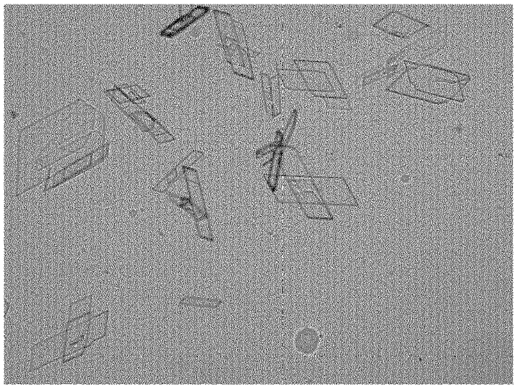
Fig 2a. Blank
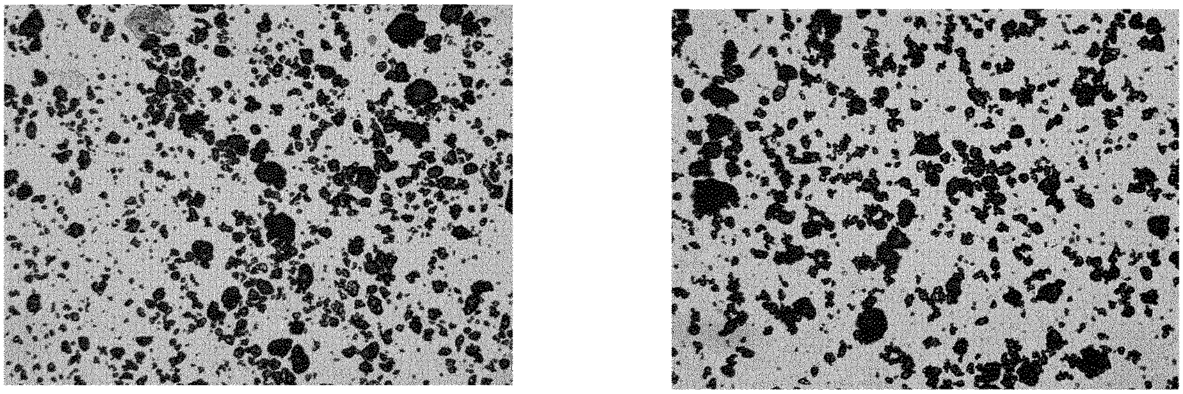
Fig 2b. centre r1 (left) and r2 (right)
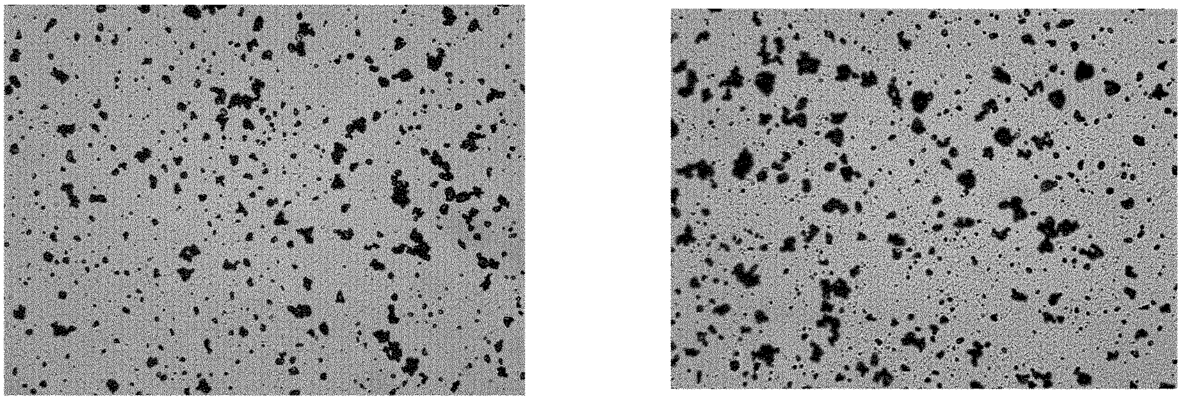
Fig 2c outer r1 (left) and r2 (right)

Tiowetting DF
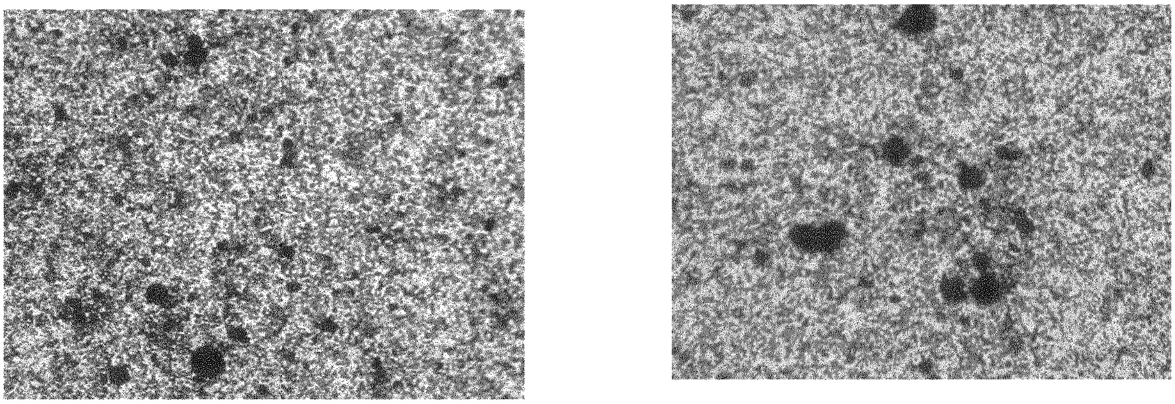
Fig 3a. Tiowetting DF centre r1 (left) and r2 (right)
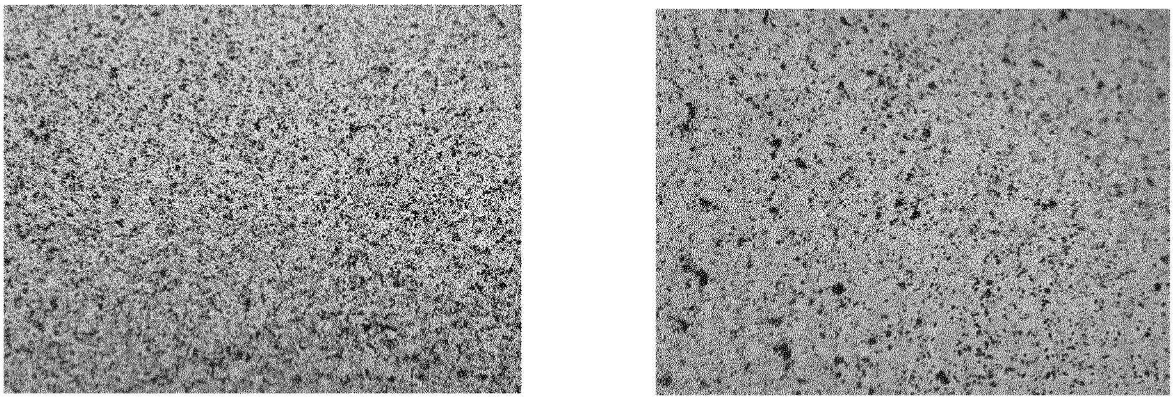
Fig 3b. Tiowetting DF outer r1 (left) and r2 (right)

Microthiol 1000 ppm
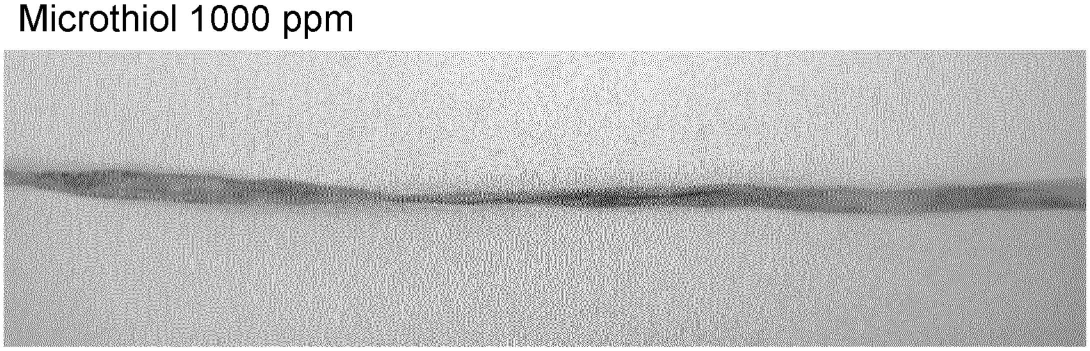
Microthiol 1000 ppm + surfactant combination C
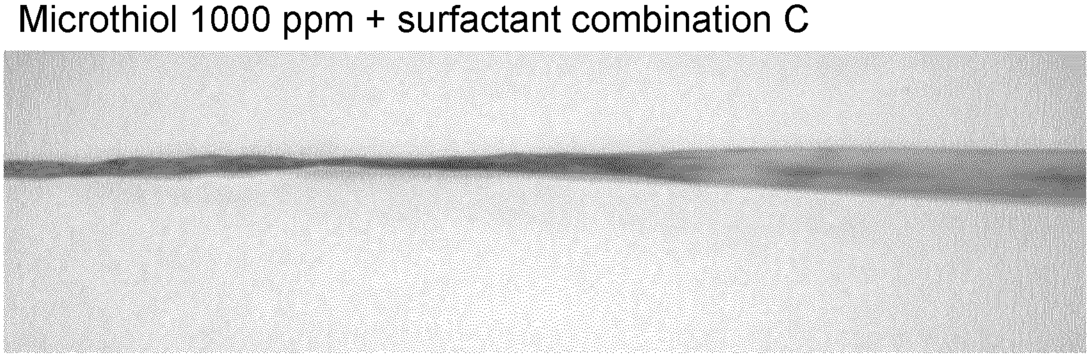
Fig 5a.
Microthiol 2000 ppm
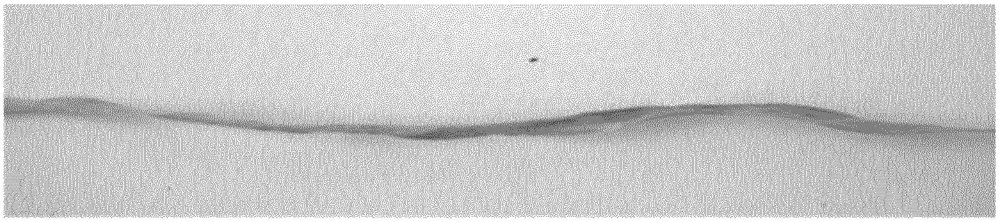
Microthiol 2000 ppm + surfactant combination C
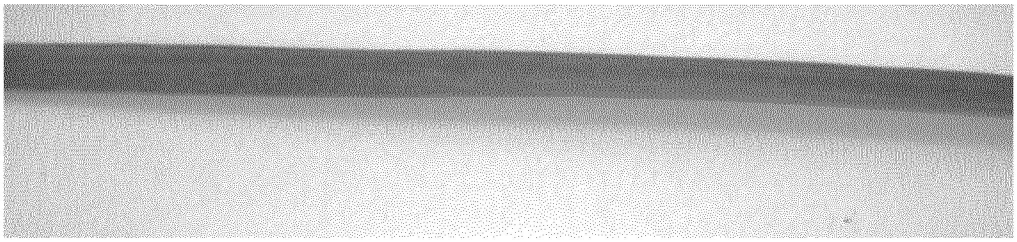
Fig 5b.

Microthiol 5000 ppm
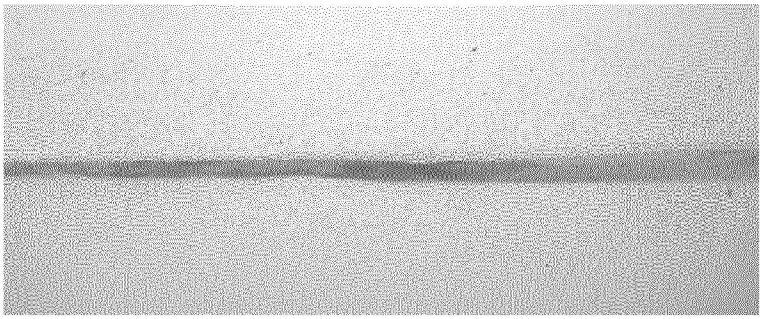
Microthiol 5000 ppm + surfactant combination C
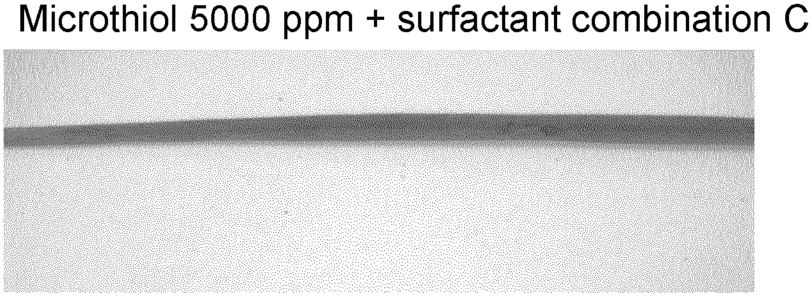
Fig. 5c.

SULFUR BASED PESTICIDES

The present invention relates to the use of sulfur as an agrochemical and in particular to the use of sulfur as a fungicide and an acaricide.

Elemental sulfur is widely used in agriculture and horticulture as a fungicide particularly to prevent or reduce the formation of scab on apples and the formation of powdery mildew on grapevines, fruit and vegetables and ornamentals, It is also used in some arable crops such as beet and cereals for the control of powdery mildew, and it has recently been proposed for the treatment of *septoria* on wheat. These fungi tend to be dispersed via airborne spores and via rain splash in the field, spreading from one plant or part of the plant to another; the sulfur is used to prevent or limit access of the fungi to the plant tissues. Sulfur in its elemental form ($S^0$) is used to control various plant pathogenic fungi, for instance *Venturia inequalis*, the cause of scab on apple and *Uncinula necator*, the cause of powdery mildew on grapevine. The use of sulfur in Integrated Pest and Disease Management (IPM) programme for Grapevines is discussed in a Final Report to GWRDC Project Number DAV 98/1 lead by Dr Bob Emmett and published in December 2003. It is also used against mites and certain insects. It is considered a pesticidal ingredient with a very low impact on the environment, though it can cause skin, eye and lung irritation in users.

Sulfur is typically applied to vegetation during the growing season and is applied to both the foliage of the plants and the fruit as they develop during the growing season. Sulfur acts preventively, through direct contact to the pest (fungal spores or hyphae, and mites) on the plant surface. Generally the amount of sulfur that is applied per hectare increases throughout the growing season as the size of the plant (both foliage and produce) increases. For example in the treatment of grapevines the initial treatment at the start of the growing season may be from 1 to 3 kg of sulfur per hectare whereas towards the end of the growing season the required treatment level may be from 5 to 12 kg of sulfur per hectare, all depending on the disease pressure and canopy volume.

Agricultural production worldwide is under permanent threat from numerous insects, mites, phytopathogenic fungi and bacteria. For the protection of yield and quality of produce and to avoid economic losses, the application of agents that control plant diseases is an absolute requirement. Although the need for pesticides is generally acknowledged there is an ongoing public concern about the negative impact of pesticides on the environment and on human health. There is a general concern about the environmental aspect of agrochemicals and the present invention provides a method whereby the amount of sulfur required for effective treatment may be reduced perhaps by as much as 50% at any particular time during the growing season.

Sulfur use as an agrochemical is typically by spraying of an aqueous suspension of the sulfur and in the case of vegetation onto the leaves and produce of the crop. Typically solid or concentrated suspensions of particulate sulfur containing formulations are supplied to the grower who will mix the formulation with water in a spray tank and then spray the suspension onto the vegetation. The sulfur based formulation typically contains one or more surfactants to aid the dispersion of the sulfur in the aqueous spray solution. The sulfur may be dispersed and/or suspended in water and the terms "solution", "dispersion" and "suspension" are used herein interchangeably. Additionally the formulation may contain other agrochemicals such as other fungicides and insecticides. In agriculture and horticulture the sulfur containing formulations are typically supplied to the grower as a wettable powder or wettable granule or in some cases liquid suspension concentrates which the grower will dilute in water for application. It is important that the formulations are stable and can be stored for a considerable period such as at least 2 years prior to use. Examples of current commercial products include Microthiol® and Tiowetting DF® which are supplied as a wettable granule both of which contain about 80 wt % sulfur. Heliosoufre S® is a suspension concentrate containing 700 g/l sulphur. These products are diluted in water for use.

Most aerial vegetation, particularly leaves and stems, has a thin waxy surface layer, the cuticle, which is highly hydrophobic. Some of the aqueous spray solutions of sulfur products that are sprayed onto the vegetation will not be retained on the vegetation and will simply run off the plant surfaces. This can result in inadequate treatment of the vegetation or the requirement of larger amounts of products to be applied in order to obtain the desired protection of the crop. Additionally the lack of retention of the suspension on the vegetation often results in uneven distribution of the sulfur across the vegetation resulting in untreated areas which will not be protected from fungal infections. The present invention addresses these problems.

European Patent 2629606 relates to the use of a novel biosulfur material as a pesticide, the biosulfur is produced by the Shell-Paques/Thiopaq™ process and is said to be unusual in that the sulfur is more hydrophilic than elemental sulfur and accordingly enables particles of size less than 10 micrometres typically less than 2.5 micrometers to be formulated in a water-based suspension that is stable and can be stored without the formation of sediment. This special sulfur is said to be effective at lower treatment rates of sulfur. The fungicide formulation, disclosed in EP2629606, contains at least one surfactant which preferably comprises at least one anionic and/or at least one non-ionic surfactant. The surfactants are used to enhance the stability of the suspension of the biosulfur in the aqueous concentrate. Table 5 of EP2629606 shows that mixtures of surfactants containing the polyethylene glycol 2, 4, 6 tristyrylphenyl ether phosphate triethanolamine salt (Soprophor® FL) are to be preferred as having the least sedimentation and that the use of the alcoholic solution of sodium octyl sulfosuccinates (Gerapon DOS) is unsatisfactory resulting in a large amount of sediment. Accordingly EP2629606 is concerned with a special and unusual form of small particle size sulfur which is hydrophilic, it is concerned with the stability of aqueous concentrates of the special form of sulfur, and is not concerned with the dispersion and retention of the sulfur on the vegetation and it discourages the use of sulfosuccinate surfactants.

Sodium lauryl sulfate has been proposed as a surfactant for use in aqueous sulfur pesticide formulations in French Patents 2517516 and 2599592. In WO2017/037277 we describe how a combination of sodium dioctylsulfosuccinate and sodium lauryl sulfate may be used with the water soluble fungicide potassium bicarbonate to control the crystal size of the potassium bicarbonate that is deposited on the vegetation once the water used in the spray solution has evaporated.

The use of dioctyl sodium sulfosuccinate together with the amphoteric surfactant dioctyl di(aminoethyl) glycine to form an aqueous dispersion of sulfur is disclosed in EP 6891711. Dialkyl sulfosuccinates are proposed for dispersing sulfur in water in JP HO 6256122 and German patent application 1768556. These references are all concerned with the dispersion of sulfur in water for subsequent use as a fungicide, they are not concerned with the additional aspect of the distribution and retention of the sulfur on the surface of the vegetation and accordingly are not concerned with optimising the fungicidal effect of the sulfur to enable a good long lasting performance at low sulfur treatment rates.

We have now found that the use of sulfosuccinate surfactants in aqueous spray dispersions of water insoluble sulfur and in particular conventional sulfur such as that obtained from the refining of crude oil and natural gas improves the retention of sulfur deposits on the surface of vegetation and furthermore improves the uniformity of the distribution of the sulfur on the surface of the vegetation and in doing so enables the desired fungicidal effect to be achieved at lower sulfur treatment rates, as much as half the treatment rate compared to standard sulfur products which do not contain these surfactants.

The present invention therefore provides the use of a sulfosuccinate as a surfactant in an aqueous dispersion of a sulfur containing pesticide to improve the retention of the aqueous spray solution on vegetation when the spray solution is sprayed onto the vegetation.

By retaining the spray solution on the vegetation, more sulfur remains on the vegetation when the water of the aqueous spray evaporates and less runs off and is wasted thus resulting in a more efficient use of the sulfur enabling a smaller amount to be used to obtain a desired degree of treatment.

In a further embodiment the invention provides the use of a sulfosuccinate as a surfactant in an aqueous dispersion of a sulfur containing pesticide to improve the distribution of the aqueous spray solution on vegetation when the spray solution is sprayed onto the vegetation.

By improving the distribution on the vegetation a more uniform pattern of sulfur particles is formed when the water of the aqueous spray evaporates thus resulting in more uniform treatment across the whole surface of the vegetation providing improved treatment for a given amount of sulfur.

In a further embodiment the invention provides a pesticide spray solution comprising water, sulfur and a sulfosuccinate.

In a further embodiment the invention provides a solid formulation of sulfur and a sulfosuccinate suitable for admixing with water to provide an aqueous sprayable pesticide.

The pesticides envisaged by this invention may be insecticides or fungicides and are useful for inhibiting, ameliorating, preventing or treating a plant and/or soil for insect infestation and/or fungal disease such as scab, powdery mildew, rust, ear blight, brown rot, leaf spots, *Septoria* species, mites, flies, scales, psyllids or *thrips* and the invention is particularly useful as a fungicide and in a preferred embodiment is used for the prevention of powdery mildew on courgettes and on grapevines and for the prevention of Zymoseptoria *tritici* on wheat.

The sulfur used in the present invention may be any form of sulfur and it is preferably milled to an average particle size (D50) of between 1 and 100 microns, preferably in the range 5 to 100 microns, more preferably in the range 10 to 50 microns, most preferably in the range 2.5 to 25 microns. The invention is particularly useful with the commercial sulfur materials which are hydrophobic and insoluble in water.

Sulfur is often produced as by-product of desulfurization of natural gas and petroleum (US Geological Survey, Mineral Commodity Summaries, January 2006). The most important process for desulfurization is the Claus process, which includes an oxidation step of hydrogen sulphide (H2S) to sulfur dioxide (SO2) and a catalysed reaction of H2S with SO2 to form elemental sulfur ($S^0$) (Schreiner, B. 2008. Chemie in unserer Zeit 42: 378).

The sulfosuccinates used in the present invention may be of two types; -diesters and monoesters commonly known as half ester and may be selected from compounds of the general formulae

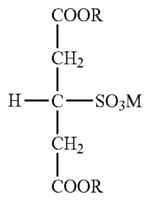

Diester

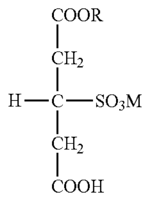

Monoester

Where M is an alkali metal usually sodium but may be potassium and where R is an alkyl group containing from 4 to 10 carbon atoms.

The diesters are the preferred sulfosuccinates for use in this invention and sodium dioctyl sulfosuccinates (docusate sodium) is the preferred sulfosuccinate for use in this invention.

It is preferred that the sulfur and the sulfosuccinates are present in the solid formulation of this invention at a ratio in the range of from 1 to 0.33 by weight to 1 to 0.005 by weight.

In preferred embodiments the formulations and the uses of the invention may include at least one further surfactant and an anionic surfactant is preferred as the further surfactant. The further surfactant may be one or more anionic surfactants selected from phosphate esters, substituted and non-substituted sulphonic acids, and their salts, monosulphate esters, naphthalene sulphonic acid derivatives, sulphonated vegetable oils, sulphonated esters of natural fatty acids, carboxylic acid derivatives, alkyl substituted succinic acid, polycarboxylic acid salts and many others. Sodium lauryl sulfate is a particularly preferred second surfactant. We prefer that the further surfactant is not an amphoteric surfactant and in one embodiment of the invention an amphoteric surfactant is excluded.

Accordingly a preferred formulation of this invention and for use in this invention comprises sulfur and sodium dioctyl sulfosuccinate and sodium lauryl sulfate and it is preferred that the amount of the sodium lauryl sulfate present in the formulation is equal to, less than or greater than the amount of sodium dioctyl sulfosuccinate; the amount being by weight.

Accordingly a preferred composition for mixing with water to produce an aqueous pesticide spray solution according to this invention comprises i) From 25 wt % to 85 wt % sulfur ii) From 0.125 wt % to 30 wt % sodium dioctyl sulfosuccinate iii) From 0.125 wt % to 30 wt % sodium lauryl sulfate.

More preferably the composition has the formulation i) From 25 wt % to 85 wt % sulfur ii) From 5 wt % to 15 wt % sodium dioctyl sulfosuccinate iii) From 5 wt % to 15 wt % sodium lauryl sulfate.

These formulations can be mixed with water to provide a pesticide spray solution and a preferred spray solution is one that contains from 0.01% to 10% sulfur, preferably 0.02% to 5% sulphur, more preferably 0.05% to 1.0% sulfur.

As mentioned one feature of this invention is the recognition that the use of the sulfosuccinate surfactant enables the desired fungicidal effect to be achieved at a lower sulfur treatment rate. The treatment rate that should be used depends upon the nature of the crop being treated, the nature of the fungus to be treated and the stage of growth of the crop during the growing season. We have however found that in many instances the invention enables a reduction in the necessary treatment rate of 40% or more typically 50% to 60%.

We have found that the use of the sulfosuccinate surfactant according to the present invention particularly together with a further surfactant such as sodium lauryl sulfate has enabled the same fungicidal activity on grapevines during the growing season at a treatment rate of sulfur about half the previously conventionally recommended rates for treatment with sulfur products. For example, in one instance improved fungicidal treatment of powdery mildew on grapevines was achieved at a treatment rate of 3.2 kg per hectare of sulfur compared to the fungicidal treatment obtained with 6.4 kg per hectare of sulfur from the commercial product Tiowetting DF. Additionally we have found that the use according to this invention enables control and prevention of *septoria* leaf blotch on cereals such as wheat and barley similar to that obtained with conventional fungicides. *Mycosphaerella graminicola*, synonym *Septoria tritici*, correct taxonomic name Zymoseptoria *tritici* is a wheat plant pathogen causing *septoria* leaf blotch that is difficult to control due to resistance to multiple fungicides.

The improved retention of the sulfur on the vegetation and the improved dispersion arises from the degree of wetting of the surface of the vegetation by the spray solution. This in turn is determined by the surface tension and contact angle of the droplets on the vegetation. We have found that typically a contact angle from 40° to 60° is desirable. Additionally we have found that smaller angles typically result in over-wetting of surfaces with spray droplets running off the crop surface whilst angles above 60° result in incomplete wetting and areas left untreated.

The present invention is illustrated by the following Examples which include both glass house and field trials. Both provide useful information although glass house trials may not always correlate with field performance due to the carefully controlled conditions.

EXAMPLE 1

The solid formulations set out in Table 1 were prepared from sulfur milled to an average particle size of 20 microns as measured by a Beckman Coulter LS particle size analyser, sodium dioctylsulfosuccinate (docusate sodium) and sodium lauryl sulfate.

TABLE 1

| Code | Sulphur (grams) | Docusate sodium (grams) | Sodium lauryl sulfate (grams) |
|---|---|---|---|
| A | 800 | 125 | 0 |
| B | 800 | 41.7 | 83.3 |
| C | 800 | 62.5 | 62.5 |
| D | 800 | 83.3 | 41.7 |

The formulations as above were incorporated into water to produce a spray solution containing 0.32% by weight of sulfur. The formulations were sprayed onto grapevines in the field at 8-10 day intervals at a treatment rate of 4 kg formulated product/hectare and the development of powdery mildew after was assessed before each successive spray application and compared to the development with no treatment and to the development with the commercial product Tiowetting DF a product containing 80 wt % sulfur applied at 4 kg formulated product/hectare and 8 kg formulated product/hectare.

Disease incidence on leaves and bunches eight days after the third application is shown below:

| Product | Powdery Mildew on leaf (frequency %) | Powdery Mildew on bunch (frequency %) |
|---|---|---|
| A (4 KG) | 34.5 c | 52.0 b |
| B (4 KG) | 29.5 c | 37.8 b |
| C (4 KG) | 41.3 c | 53.0 b |
| D (4 KG) | 58.0 bc | 63.3 b |
| Tiowetting DF (4 KG) | 78.0 ab | 96.3 a |
| Tiowetting DF (8 KG) | 62.3 bc | 73.9 b |
| No treatment | 97.5 a | 99.8 a |

The letters referring to statistically different data groups.

Statistical analysis confirmed no significant differences between Products A, B, C and D applied at 4 kg/hectare and Tiowetting DF applied at 8 kg/ha on leaves and bunches.

EXAMPLE 2

In a glasshouse trial sodium dioctylsulfosuccinate and sodium lauryl sulphate in the ratio used in Product D from Example 1 was used in combination with Microthiol WG 80% which is a 800 g/kg (80%) sulfur wettable granule commercial formulation.

The Microthiol was mixed with the surfactant combination at different concentrations and applied to grapevine seedlings in the glasshouse. The plants were infected artificially with powdery mildew 24 hours later.

The materials used and the amounts used are set out in Table 2 below and 10 plants were used in each experiment.

TABLE 2

| No | Product | Rate |
|---|---|---|
| 1 | Check = only water | |
| 2 | Microthiol WG 80% | 50 ppm |
| 3 | Microthiol, WG 80% | 100 ppm |
| 4 | Microthiol WG 80% | 200 ppm |
| 5 | Microthiol WG 80% | 400 ppm |
| 6 | Surfactant combination D alone | 50 ppm |
| 7 | Surfactant combination D alone | 100 ppm |
| 8 | Surfactant combination D alone | 400 ppm |
| 9 | Microthiol + surfactant combination D | 50 + 100 ppm |
| 10 | Microthiol + surfactant combination D | 50 + 400 ppm |
| 11 | Microthiol + surfactant combination D | 100 + 50 ppm |
| 12 | Microthiol + surfactant combination D | 100 + 100 ppm |
| 13 | Microthiol + surfactant combination D | 100 + 400 ppm |
| 14 | Microthiol + surfactant combination D | 200 + 50 ppm |
| 15 | Microthiol + surfactant combination D | 200 + 100 ppm |
| 16 | Microthiol + surfactant combination D | 200 + 400 ppm |
| 17 | Microthiol + surfactant combination D | 400 + 50 ppm |
| 18 | Microthiol + surfactant combination D | 400 + 100 ppm |
| 19 | Microthiol + surfactant combination D | 400 + 400 ppm |

Surfactant combination D as used in Product D of Example 1.

The results are set out in Table 3 below.

TABLE 3

| Powdery mildew disease severity and protection | | |
|---|---|---|
| Thesis | Severity (%) | Protection Efficiency (%) |
| Water Check | 74.6 | |
| Microthiol 50 ppm | 53.8 | 28.0 |
| Microthiol 100 ppm | 30.8 | 58.8 |
| Microthiol 200 ppm | 23.2 | 69.0 |
| Microthiol 400 ppm | 17.8 | 76.1 |
| Surfactant combination D 50 ppm | 65.3 | 12.5 |
| Surfactant combination D 100 ppm | 62.9 | 15.8 |
| Surfactant combination D 400 ppm | 56.4 | 24.5 |
| Microthiol 50 ppm + surfactant combination D 100 ppm | 43.8 | 41.4 |
| Microthiol 50 ppm + surfactant combination D 400 ppm | 36.4 | 51.2 |
| Microthiol 100 ppm + surfactant combination D 50 ppm | 41.6 | 44.,3 |
| Microthiol 100 ppm + surfactant combination D 100 ppm | 20.5 | 72.6 |
| Microthiol 100 ppm + surfactant combination D 400 ppm | 26.1 | 65.1 |
| Microthiol 200 ppm + surfactant combination D 50 ppm | 17.9 | 76.0 |
| Microthiol 200 ppm + surfactant combination D 100 ppm | 16.8 | 77.4 |
| Microthiol 200 ppm + surfactant combination D 400 ppm | 12.3 | 83.6 |
| Microthiol 400 ppm + surfactant combination D 50 ppm | 9.4 | 87.5 |
| Microthiol 400 ppm + surfactant combination D 100 ppm | 5.0 | 93.3 |
| Microthiol 400 ppm + surfactant combination D 400 ppm | 4.3 | 94.2 |

Untreated checks exhibit a percentage of disease severity of 75% (Table 3). This severity is moderate to high and validates the trial.

At 50 ppm of Microthiol, disease severity is statistically lower than the one obtained on the untreated check. From 50 ppm to 400 ppm, disease severity is reduced from 54 to 18% indicating a clear dose effect.

The results in Table 3 show that the addition of the surfactant combination to Microthiol significantly improves the protection efficiency at all rates of Microthiol tested. It was also observed that the variations between replicates in the trial were significantly reduced in the treatments where the surfactant combination was mixed with Microthiol. Analysis was carried out to determine if the improvements in protection efficiency were additive or synergistic.

Compatibility Analyses

Calculation of synergistic, antagonistic or additive responses was performed using the well known Colby formula (1967, 2015): $E=X+Y-(X*Y)/100$. Whereas, E is the expected value of protection efficiency (disease protection expressed in percentage) of a mixture of 2 products X and Y; X and Y are respectively the % of disease protection of product X or Y when applied individually, and XY the % of disease protection obtained when products X and Y are applied in combination.

Whereas, if E=observed value, the combination is additive; If E<observed value, the combination is synergistic; and if E is > to the observed value, the combination is antagonistic.

The results of this analysis are shown in Table 4 and indicate that a synergistic effect is observed at each concentration of Microthiol and consistently with the higher Microthiol rate of 400 ppm (difference between assessed value and expected value).

Table 4: Expected disease protection values calculated using the Colby formula in comparison with the observed scored values

TABLE 4

| Microthiol and Surfactant Combination D Concentrations (ppm) | Expected value of disease protection (%) calculated using Colby formula | Assessed value of disease protection (%) | Effect |
|---|---|---|---|
| Microthiol 50 + D 100 | 39.4 | 41.4 | no effect |
| Microthiol 50 + D 400 | 45.6 | 51.2 | synergistic |
| Microthiol 100 + D 50 | 63.9 | 44.3 | antagonistic |
| Microthiol 100 + D 100 | 65.3 | 72.6 | synergistic |
| Microthiol 100 + D 400 | 68.9 | 65.1 | no effect |
| Microthiol 200 + D 50 | 72.8 | 76.0 | no effect |
| Microthiol 200 + D 100 | 81.8 | 77.4 | no effect |
| Microthiol 200 + D 400 | 76.6 | 83.6 | synergistic |
| Microthiol 400 + D 50 | 79.1 | 87.5 | synergistic |
| Microthiol 400 + D 100 | 79.9 | 93.3 | synergistic |
| Microthiol 400 + D 400 | 82.0 | 94.2 | synergistic |

D = surfactant combination D

EXAMPLE 3

A field trial was conducted to investigate mixtures of the surfactant combination D employed in Example 2 with Tiowetting DF a commercial product containing 800 g/kg sulfur. Tiowetting DF at a dose rate of 4 kg/ha was mixed with the surfactant combination D at 250 g/ha, 500 g/ha and 750 g/ha and the performance on grapevines against powdery mildew was compared to Tiowetting DF alone at 4 kg/ha and 8 kg/ha. Applications were made at 7 day intervals in a spray volume of 1000 l water/hectare. Disease severity was assessed on leaves and on bunches seven days after the ninth application. Disease severity in the untreated control was 78.8% on leaves and on 84.0% bunches and the amount by which the presence of the powdery mildew was reduced compared to the control are shown in Table 5.

TABLE 5

| Treatment | Reduction of Powdery Mildew on Leaves (% control) | Reduction of Powdery Mildew on Bunches (% control) |
|---|---|---|
| 4 kg/ha Tiowetting DF + 250 g/ha surfactant combination D | 94.8 b | 70.1 b |
| 4 kg/ha Tiowetting DF + 500 g/ha surfactant combination D | 96.8 b | 84.9 ab |
| 4 kg/ha Tiowetting DF + 750 g/ha surfactant combination D | 99.8 a | 96.9 a |
| 4 kg/ha Tiowetting DF | 85.7 c | 44.8 c |
| 8 kg/ha Tiowetting DF | 96.8 b | 79.4 ab |

The letters refer to statistically different data groups.

Powdery mildew disease control on leaves and bunches with 4 kg/ha Tiowetting DF+surfactant combination D at 250 g/ha, 500 g/ha and 750 g/ha was equal to or better than 8 kg/ha Tiowetting DF alone.

EXAMPLE 4

In another field trial on grapevines Tiowetting DF was applied at 2 kg/ha, 4 kg/ha and 8 kg/ha alone or in mixture with the surfactant combination D used in Example 2 at 750 g/ha. Applications were made at 7 day intervals in a spray volume of 1000 l water/hectare. Disease severity was assessed on leaves and on bunches seven days after the ninth application. Disease severity in the untreated control was 76.0% on leaves and on 77.0% bunches and the amount by which the presence of the powdery mildew was reduced compared to the control are shown in Table 6.

TABLE 6

| Treatment | Reduction of Powdery Mildew on Leaves (% control) | Reduction of Powdery Mildew on Bunches (% control) |
|---|---|---|
| 2 kg/ha Tiowetting DF + 750 g/ha surfactant combination D | 91.4 ab | 79.6 ab |
| 4 kg/ha Tiowetting DF + 750 g/ha surfactant combination D | 97.0 a | 90.3 a |
| 8 kg/ha Tiowetting DF + 750 g/ha surfactant combination D | 99.9 a | 99.2 a |
| 2 kg/ha Tiowetting DF | 62.1 c | 40.9 c |
| 4 kg/ha Tiowetting DF | 82.0 b | 71.9 b |
| 8 kg/ha Tiowetting DF | 99.0 a | 93.8 a |

The letters refer to statistically different data groups.

Powdery mildew disease control on leaves and bunches with 2 kg/ha, 4 kg/ha and 8 kg/ha Tiowetting DF+the surfactant combination D at 750 g/ha was always equal to 8 kg/ha Tiowetting DF alone.

Accordingly the use of the surfactant combination according to this invention increases the efficacy of sulfur by up to 4-fold and reduces the required amount of sulfur for a desired degree of treatment at least by half.

EXAMPLE 5

In another field trial on courgettes grown in a glasshouse, the Products from Example 1 were tested at 4 kg/ha in comparison to Tiowetting DF applied at 4 kg/ha and 8 kg/ha. Powdery mildew disease incidence and severity were assessed 14 days after seven applications of the fungicides at 7 day intervals. The results are shown in Table 7 below.

TABLE 7

| Product | Powdery Mildew on leaves (% incidence) | Powdery Mildew on leaves (% severity) |
|---|---|---|
| A (4 KG) | 4.5 c | 0.2 c |
| B (4 KG) | 3.5 c | 0.16 c |
| C (4 KG) | 4.0 c | 0.08 c |
| D (4 KG) | 3.0 c | 0.04 c |
| Tiowetting DF (4 KG) | 11.5 b | 5.65 b |
| Tiowetting DF (8 KG) | 7.5 c | 1.07 c |
| No treatment | 100.0 a | 100.0 a |

The letters referring to statistically different data groups.

Each of the four Products applied at 4 kg/ha were in the same statistical group as 8 kg/ha Tiowetting DF, and numerically the disease control was better with all four Products than with the higher rate of the sulphur standard.

EXAMPLE 6

In a controlled environment trial, sodium dioctylsulfosuccinate and sodium lauryl sulphate in the ratio used in Product C from Example 1 was used in combination with Microthiol WG 80%, applied to wheat seedlings at the two leaf stage in a growth chamber. The plants were inoculated artificially with Zymoseptoria *tritici* 24 hours later.

The materials used and the amounts used are set out in Table 8 below; there were 30 seeds in each pot and 3 pots were used for each treatment. Comparisons were made to treatments with two reference fungicides, Aviator Xpro applied 24 hours before infection and Heliosoufre S applied 5 days and 24 hours before infection, and with Microthiol applied alone at treatment rates of up to 5000 ppm as well as the untreated control which was sprayed with water.

TABLE 8

| No | Product | Rate |
|---|---|---|
| 1 | Untreated (water) control | |
| 2 | Aviator Xpro | |
| 3 | Heliosoufre S | |
| 4 | Microthiol WG 80% | 200 ppm |
| 5 | Microthiol WG 80% | 500 ppm |
| 6 | Microthiol WG 80% | 1000 ppm |
| 7 | Microthiol WG 80% | 2000 ppm |
| 8 | Microthiol WG 80% | 5000 ppm |
| 9 | Microthiol + surfactant combination C | 200 ppm + 31.25 ppm |
| 10 | Microthiol + surfactant combination C | 500 ppm + 78.125 ppm |
| 11 | Microthiol + surfactant combination C | 1000 ppm + 156.25 ppm |
| 12 | Microthiol + surfactant combination C | 2000 ppm + 312.5 ppm |
| 13 | Microthiol + surfactant combination C | 5000 ppm + 781.25 ppm |

Aviator Xpro is available from Bayer and is an emulisifiable concentrate containing bixafen and prothioconazole.

The results are shown in FIG. 4 which shows the percentage of *septoria* leaf blotch disease severity on wheat treated with different concentrations of Microthiol applied alone or in mixture with surfactant combination C (ANL-AD002). Letters correspond to statistically different data groups (Kruskal-Wallis test, 5% threshold). Error bars correspond to 95% confidence limits. FIG. 4 shows that *septoria* leaf blotch was well controlled by the reference fungicide Aviator Xpro and the internal control fungicide Heliosoufre S, but no disease control was observed with Microthiol applied alone up to the highest rate, 5000 ppm. Addition of surfactant combination C to Microthiol at concentrations of 1000 ppm and above resulted in reduction of *septoria* disease; at 2000 ppm and 5000 ppm Microthiol mixed with respectively 312.5 ppm and 781.25 ppm of surfactant combination C, there was no significant difference to the control achieved with the reference fungicides.

Photographs of infected leaves in FIGS. 5a, b and c show the severe damage caused by *septoria* leaf blotch on leaves treated with Microthiol alone at 1000, 2000 and 5000 ppm respectively and the good control achieved by the mixture of the same concentration of Microthiol and the surfactant combination C.

EXAMPLE 7

This is not an Example of the invention as the formulations do not contain sulfur however the Example assesses the surface wetting properties of the preferred surfactants used in this invention. The wetting properties of the individual surfactants and in combination were evaluated by dissolving the surfactants at various concentrations in deionised water. Surface tension and equilibrium contact angle were measured in triplicate using a drop shape analyser with results given in Table 9 below.

TABLE 9

| Concentration (% w/w) | surface tension (mN/m) | contact angle (°) |
|---|---|---|
| Water | 74.5 | 108.6 |
| sodium lauryl sulfate (SLS) | | |
| 0.005 | 70.6 | 107.1 |
| 0.025 | 56.8 | 72.8 |
| 0.050 | 46.1 | 63.9 |
| 0.100 | 37.2 | 55.3 |
| 0.200 | 34.2 | 51.5 |
| 0.250 | 33.4 | 50.6 |
| sodium dioctylsulfosuccinate (SDS) | | |
| 0.005 | 44.3 | 54.1 |
| 0.010 | 43.6 | 38.2 |
| 0.025 | 34.7 | 35.4 |
| 0.050 | 32.2 | 31.5 |
| 0.100 | 28.3 | 28.7 |
| 0.200 | 26.8 | 24.4 |
| 0.250 | 26.1 | 22.8 |
| 0.500 | 25.3 | 21.4 |
| SLS + SDS | | |
| SLS @ 0.025 + SDS @ 0.025 | 34.3 | 45.5 |
| SLS @ 0.050 + SDS @ 0.050 | 32.5 | 38.6 |
| SLS @ 0.100 + SDS @ 0.100 | 30.4 | 36.9 |

Table 9 shows that there are clear differences between the surface tension values of the surfactants. SDS is very effective at reducing surface tension of water with little dependence on concentration. SLS on the other hand lowers the surface tension but to a far lesser extent and demonstrates a greater dependence on concentration (there is roughly a factor of 10 difference between the two surfactants). Values for the combination are clearly governed by the level of SDS with little effect imparted by the SLS component.

In terms of contact angle there is a similar trend with SDS giving small equilibrium values and SLS providing intermediate values between SDS and water. Here however the combination gives values midway between the individual components at circa 45°. Generally, a contact angle between 40-60° is considered ideal wetting for aqueous pesticide spray solutions on plant surfaces and this Example shows that use of the combination of the surfactants enables this to be achieved.

EXAMPLE 8

Product A and Product C from Example 1 and Tiowetting DF (all 800 g/kg Sulfur formulations) were diluted to an equivalent field rate of 4 kg formulated product/1000 L in CIPAC D water. Dilutions were inverted 10 times and a 200 μl droplet was deposited onto a microscope slide. Slides were allowed to dry undisturbed for 4 hours and imaged at 100× magnification. Blank samples of Product A and Product C were prepared without sulfur to provide a baseline for background appearance. No blank formulation of Tiowetting DF was available.

Replicate photographs (r1 and r2) were taken at the centre of the slide and at the outer edge and the images obtained are FIGS. 1*a*, 1*b* and 1*c* (Product A), 2*a*, 2*b* and 2*c* (Product C) and 3*a* and 3*b* (Tiowetting DF) attached hereto.

The figures show some clear differences between formulations. In the case of Product A there is a uniform distribution of sulfur particles throughout the centre and outer region of the droplet. The overall coverage appears light compared to Product C, where there is a higher concentration of sulphur particles in the centre of the droplet. These differences are likely to be linked to surface tension which is lower for Product A (sodium dioctylsulfosuccinate alone) than for Product C (sodium dioctylsulfosuccinate/sodium lauryl sulfate combination) resulting in more wetting of the surface and a thinner deposit.

Dispersion is poorer in the case of Tiowetting alone where there are several larger sulphur particles concentrated in the centre of the droplet in amongst a continuous deposition of very fine material. The fine material in this figure is likely to be clay employed as a carrier in the Tiowetting granule formulation whilst the larger particles are sulfur agglomerates. All three formulations contain equal amounts of sulfur, and the overall coverage obtained using the surfactants of this invention is clearly improved.

The invention claimed is:

1. A pesticide formulation comprising: an aqueous spray containing:

a) sulfur;

b) a sulfosuccinate; and c) sodium lauryl sulfate;

wherein the sulfosuccinate is sodium dioctyl sulfosuccinate.

2. The pesticide formulation according to claim 1, wherein a ratio by weight of the sulfosuccinate and sodium lauryl sulfate is in a range of from 1:2 to 2:1.

3. The pesticide formulation according to claim 1, which does not contain an amphoteric surfactant.

4. The pesticide formulation according to claim 1, wherein the aqueous spray is a solution that contains from 0.01% to 10% by weight sulfur.

5. A composition containing:

i) from 25 wt % to 85 wt % sulfur;

ii) from 0.125 wt % to 30 wt % sodium dioctyl sulfosuccinate; and iii) from 0.125 wt % to 30 wt % sodium lauryl sulfate;

wherein the composition is for mixing with water to provide a pesticide spray solution.

6. The pesticide formulation according to claim 1, wherein the sulfur and the sulfosuccinate are present in the aqueous spray in a ratio of from 1 to 0.33 by weight to 1 to 0.005 by weight.

* * * * *